(No Model.)
J. A. MINGER.
HARROW.
No. 337,186. Patented Mar. 2, 1886.
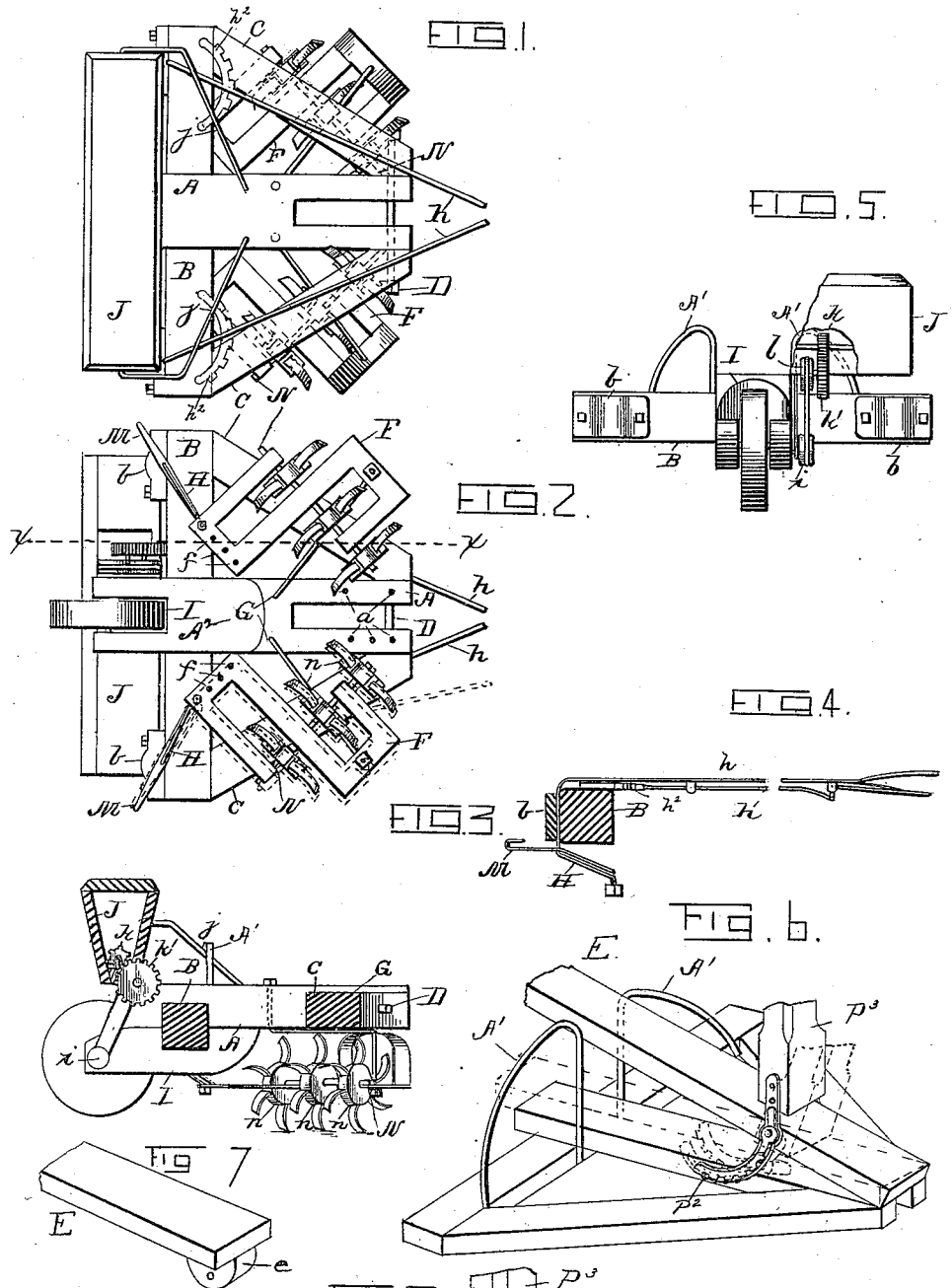
Witnesses:
Norris A. Clark.
R. W. Bishop.
Inventor:
John A. Minger
By his Attorneys:
R.S. & A.P. Lacey
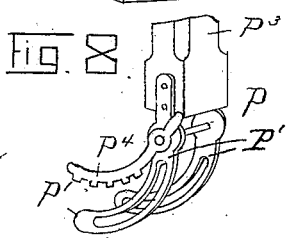

UNITED STATES PATENT OFFICE.

JOHN A. MINGER, OF SABETHA, KANSAS.

HARROW.

SPECIFICATION forming part of Letters Patent No. 337,186, dated March 2, 1886.

Application filed November 14, 1885. Serial No. 182,843. (No model.)

*To all whom it may concern:*

Be it known that I, JOHN A. MINGER, a citizen of the United States, residing at Sabetha, in the county of Nemaha and State of Kansas, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to rotary harrows; and it consists in the novel details of construction and arrangement of parts, all as more fully hereinafter set forth, and particularly claimed.

In the accompanying drawings, Figure 1 represents a plan view of the complete machine. Fig. 2 is an inverted plan view. Fig. 3 is a section on the line $xx$ of Fig. 2. Fig. 4 is an enlarged detail of the harrow-frame-operating lever. Fig. 5 is a bottom plan view of a portion of the harrow, showing a section of the harrow and the mechanism for discharging the grain therefrom. Figs. 6 and 8 are details to show the adjusting device for the tongue, and Fig. 7 shows the end of the tongue.

The main frame of the harrow consists of a center beam, A, front cross-bar, B, and side bars, C, oppositely inclining and attached at their front ends to the bar B, and extending rearwardly and inwardly till they meet the center beam, to which they are securely fastened, preferably by a single bolt, D.

A tongue, E, is preferably attached to the rear end of the frame and extends upwardly and forward, and is provided with the usual double and single whiffletrees, while the tongue or pole may be attached to the frame in any convenient manner. The way shown is best adapted, as it does not interfere with any of the parts of the machine.

Beneath the main frame S-shaped frames F are adjustably supported by compound crank-arms G and H, the former of which are pivotally attached at one end to the frame F, while their other ends are adjustably secured in one of a series of apertures, $a$, formed on the under side of the beam A. The compound crank-arms H are adjustably connected to the opposite end of the frames F by having their inner ends pass through one of a series of openings, $f$, formed therein. Their other ends are journaled in boxes $b$, suitably fastened to the forward edge of the main frame, above which they extend and project backward, forming the handle or lever $h$.

A bracket, I, projecting from the under side of the main frame, is provided with a drive-wheel, the shaft of which is prolonged and carries a grooved pulley, $i$, around which a band passes to communicate motion to a force-feed shaft located in the bottom of a grain-hopper, J, through the intermeshing gearing K K′, and a corresponding pulley, $l$, located on the shaft of the gear-wheel K′. The hopper J is of ordinary construction, and is secured to the forward part of the machine and braced by rods $j$. The shaft N is journaled in the outer ends of the short arms of the S-shaped frames F, and is provided with rotary cutters or knives $n$, so disposed that an arm of the frame F comes between each two of the cutters, thereby more evenly distributing the strain of the cutters over their supporting-frame.

In practice, as the machine is drawn forward, the shaft carrying the cutters may be moved in or out, to avoid injury to the grain, by grasping the handle $h$ and shifting the same to either the right or left. The angle formed between the cutter-supporting shafts and the draft of the machine may be increased or diminished by adjusting the ends of the compound crank-arms in either one of the series of holes $a$ or $f$, formed in the main S-shaped or cutter-supporting frames, respectively. The inner ends of the cutter-supporting shafts may be brought closer to or separated from each other by adjusting either one of the crank-arms.

When the machine is used for seeding purposes, the tongue is taken off and the horse is attached directly to the bar B by suitable hitching devices, as the hooks M. When it is used as a cultivator, the grain box or hopper J is removed and the tongue E is attached, as shown, and the draft-bar will be attached thereto in any usual manner.

An adjusting-slide, P, is pivotally attached to the tongue. It may be composed of one or of two slotted arms, P', which slide upon a pin or pins, P², fixed on the beam A. To the extended upper ends of these arms an operating-lever, P³, is attached. A ratchet-bar, P⁴, is pivoted on the side of one of the slotted arms, and is adapted to engage on the outer end of the pin P², and thereby lock the tongue in any desired place.

The operating-levers $h$ are held by rack-bars $h^2$ and sliding pawls $h'$, secured on the levers $h$, as shown.

Guide-posts A' are secured to the frame, and prevent any lateral twisting of the tongue.

By reference to Fig. 7 it will be noticed that the tongue has a depending lug, $e$, by which it is pivoted to the rear end of the center beam, A², on the bolt D.

Having thus described my invention, what I claim, and desire to secure by Letters Patent, is—

1. In a harrow, the combination, with the main frame, of a supplemental harrow-frame laterally adjustably secured thereto, and a pair of compound crank-arms, as G and H, adjustably connected with the supplemental frame and the main frame, to regulate the position and adjustment of the supplemental harrow, substantially as described.

2. The combination, with the main frame, of an S-shaped harrow-supporting frame, a single shaft journaled in bearings on the short arms of the latter frame at right angles to said arms, and rotary cutters disposed on said shaft to have a limb of the S-shaped frame come between a pair of cutters, substantially as and for the purposes specified.

3. The combination, with the main frame having a series of apertures, of an S-shaped frame, compound crank-arms G and H, the one pivoted at one end to the latter frame and adjustably secured at its other end in one of the apertures formed in the main frame, and the other adjustably secured at one end to the S-shaped frame, and journaled at one end to the main frame and provided with an extension to form a handle, a shaft journaled on the short arms of the S-shaped frame, and rotary cutters mounted on said shaft, substantially as described.

4. The combination, with the frame and the tongue pivotally connected therewith, of a slotted slide pivoted to the tongue, an operating-lever attached to the upper end of the slide, a pin projected from the side of the frame and working through the slot in the slide, and a ratchet-bar pivoted to the slide, to engage said pin and lock the tongue at right angles, substantially as set forth.

In testimony whereof I affix my signature in presence of two witnesses.

JOHN A. MINGER.

Witnesses:
CHRIST. O. MINGER,
G. CHRIST.